United States Patent [19]

Geohegan, Jr. et al.

[11] 4,439,845

[45] Mar. 27, 1984

[54] SONAR SYSTEM

[75] Inventors: Kenneth P. Geohegan, Jr., Catonsville; Henry M. Gruen, Arnold, both of Md.

[73] Assignee: Westinghouse Electric Corp., Pittsburgh, Pa.

[21] Appl. No.: 327,151

[22] Filed: Dec. 3, 1981

[51] Int. Cl.³ .............................................. G01S 15/04
[52] U.S. Cl. ......................................... 367/87; 367/101
[58] Field of Search ............................ 367/87, 99, 101

[56] References Cited

U.S. PATENT DOCUMENTS

| | | | |
|---|---|---|---|
| 2,871,459 | 1/1959 | Berry | 367/101 |
| 3,174,127 | 3/1965 | Haslett | 367/101 X |
| 3,212,053 | 10/1965 | Finney | 367/101 |
| 3,302,161 | 1/1967 | Ellison | 367/101 X |
| 3,603,919 | 9/1971 | Moore | 367/101 X |
| 3,705,381 | 12/1972 | Pipkin | 367/101 X |
| 3,757,287 | 9/1973 | Bealor, Jr. | 367/87 X |
| 3,786,405 | 1/1974 | Chramiec et al. | 367/101 X |
| 3,943,482 | 3/1976 | Murphree et al. | 367/101 |
| 4,047,172 | 9/1977 | Bauer et al. | 367/101 X |
| 4,056,802 | 11/1977 | Rabon | 367/112 |
| 4,216,537 | 8/1980 | Deligniers | 367/88 |

Primary Examiner—Richard A. Farley
Attorney, Agent, or Firm—D. Schron

[57] ABSTRACT

A sonar system for positive identification of certain resonant body targets such as mines. Two acoustic signals of different frequencies are transmitted toward the target and the acoustic returns are separated into the component frequencies, detected, and thereafter subtracted from one another. A signal, above a threshold value, resulting from the subtraction is indicative of a resonant body target and the indication is displayed and/or recorded.

3 Claims, 9 Drawing Figures

SONAR SYSTEM

BACKGROUND OF THE INVENTION

1. Field of the Invention

The invention in general relates to underwater target identification systems, and more particularly to a system for detecting and classifying a resonant target.

2. Description of the Prior Art

Very often when searching for underwater targets such as mines or the like, use is made of a relatively high frequency side-looking sonar apparatus. Basically, the side-looking sonar apparatus travels over a target area under surveillance, typically the sea bed, and in the course of travel periodically projects acoustic pulses toward the target area and receives returns from extremely narrow strips on the target area. After a plurality of transmissions and receptions, a map of the target area, and targets on it, may be built up and with almost photographic qualities so as to permit identification of various targets.

The problem sometimes arises, however, in that the target may not lie on the sea bed. For example, over the course of time a target may become buried, in which case, the high-frequency signal utilized in the side-looking sonar arrangement may not permit detection and classification of the buried target. Although a lower frequency acoustic signal may be utilized for penetration of the sea bed, any target therein would just be detected and not necessarily classified. For example, an acoustic return from a rock may be indistinguishable from that of a mine.

SUMMARY OF THE INVENTION

The sonar system of the present invention provides for the detection and classification of targets including those which may be buried in the sea bed.

The system includes means for transmitting at least first and second acoustic signals of different frequencies toward a target area under investigation, with the frequencies being within the resonant frequency range of expected targets such as a mine. Means are provided for comparing acoustic returns due to the first acoustic signal with those due to the second acoustic signal. If the acoustic signals are reflected from a non-resonant body, the envelopes of the two received signals will be substantially identical whereas if the returns are from a resonant body, the returns will be different. The result of the comparison may be provided to some utilization device such as a display and/or recorder.

DESCRIPTION OF THE PREFERRED EMBODIMENT

The present invention makes use of the well-known fact that an acoustic return from a resonant body consists basically of two portions, the first depending upon just the shape and orientation of the body, that is, the same return that would occur if the body were perfectly rigid. The second portion of the acoustic return from a resonant body is due to the re-radiation of acoustic energy absorbed from the transmitted pulse and which continues after the transmitted pulse has passed over the body. Under certain conditions, depending upon the shape and orientation of the target, as well topography and consistency of the target area, a rigid body may produce an acoustic return which may be interpreted as a return from a resonant body.

Basically, in the present invention, at least two acoustic signals are transmitted toward a target area under surveillance with the frequencies of the signals being slightly different from one another and yet with both selected to be within the approximate resonant frequency range of particular expected targets.

Figure 1:
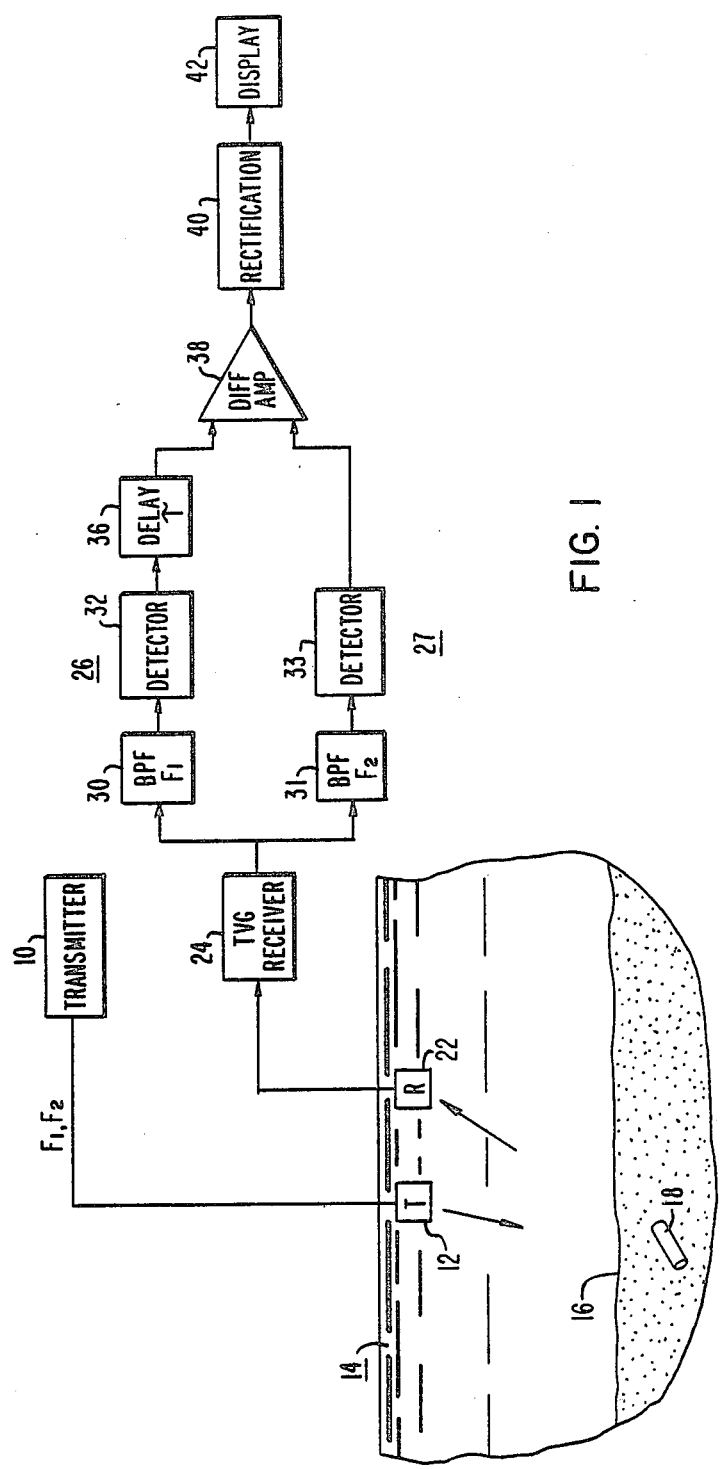
FIG. 1 is a block diagram of a sonar system in accordance with one embodiment of the present invention.

Accordingly, in FIG. 1 a transmitter 10 is constructed and arranged to provide signals of slightly different frequencies $F_1$ and $F_2$ to a transmitting transducer 12. The acoustic signals thus generated are projected through the water medium 14 toward a target area such as the sea bed 16 for the detection of resonant targets, one of which, 18, is illustrated as being buried in the sea bed.

Frequencies $F_1$ and $F_2$ are relatively low frequencies selected in accordance with some a prior knowledge of the target and low enough for acoustic penetration of the sea bed 16.

If the target 18 is a non-resonant body, the envelopes of the acoustic returns from the $F_1$ and $F_2$ signals will be substantially identical whereas if the target is a resonant body, the envelopes will be different to such extent that the difference may be detected thereby indicating a resonant target classification. In one embodiment, the means for comparing the two acoustic returns include a receiver transducer 22 which, in response to acoustic energy reflected from the target, will provide a corresponding output signal to receiver 24. Preferably this receiver is of the time-varying gain variety whereby the amplification of the received signal increases as a function of time. Such receivers find extensive use in the sonar signal processing field. Although not illustrated, a single transducer may be utilized to perform both the transmitting and receiving functions, in which case appropriate transmit-receive switching circuitry would be provided. Alternatively, separate transducers designed for operation at a particular frequency may be used for transmission and reception of the $F_1$ and $F_2$ signals. For the projection of relatively low frequency signals, a parametric sonar arrangement may be desirable.

The output of receiver 24 is simultaneously provided to two channels 26 and 27, each including respective bandpass filters 30 and 31 as well as detectors 32 and 33.

The two acoustic signals of frequencies $F_1$ and $F_2$ may be transmitted either simultaneously or alternatively. Assuming by way of example that they are transmitted alternatively with the signal of frequency $F_1$ being transmitted first, then signal processing channel 26 would include a delay circuit 36 with the delay time $\tau$ being equivalent to the time between successive pulses.

The processed signals from the two channels 26 and 27 are compared, such as by difference amplifier 38, the output of which is rectified by rectification circuits 40 and then provided to a utilization means such as display 42 which may also include recording equipment.

Figure 2A:
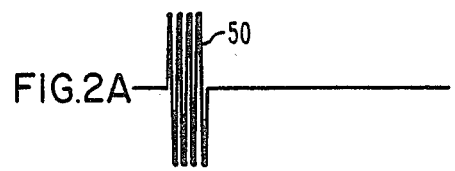
FIGS. 2A through 2H are curves illustrating certain waveforms during the operation of the present invention.
Figure 2B:
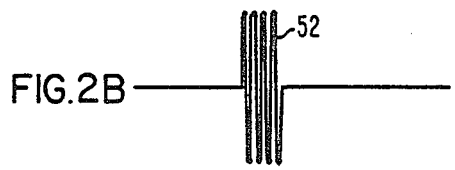
Figure 2C:
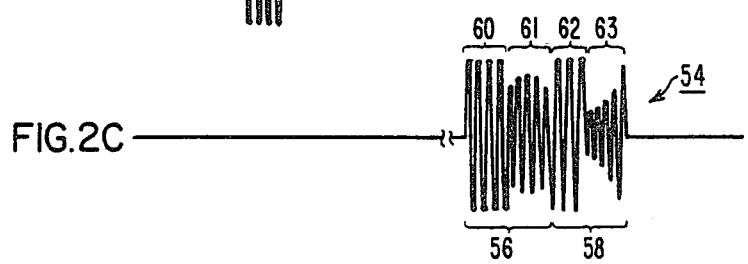

Additional reference is now made to the curves of FIGS. 2A through 2H, which depict waveforms at various points in the system of FIG. 1. Waveforms 50 and 52 of FIGS. 2A and 2B represent the transmitted signals of respective frequencies $F_1$ and $F_2$. Waveform 54 of FIG. 2C represents the composite received signal appearing at the output of receiver 24. Assuming a return from a resonant body, the compositive waveform 54 includes a first component 56 resulting from the signal of frequency $F_1$ and a second component 58 resulting from the signal of frequency $F_2$. The first component 56 is seen to include a first portion 60 which is predominantly a reflection of the transmitted pulse and a function of the shape and orientation of the body. The second portion 61 is a function of the re-radiation by the resonant target. Similarly, portion 62 of the second component 58 is predominantly a reflection of the transmitted pulse of frequency $F_2$ while portion 63 is a function of the re-radiated energy by the resonant target. If the target were not resonant, the first and second components 56 and 58 would be substantially identical. Since a resonant target is assumed however, the components are different, more particularly, the respective second portion 61 and 63, since the resonant response of the target is different in response to the different frequencies.

Figure 2D:
Figure 2E:
Figure 2F:

Bandpass filter 30 is responsive to waveform 54 to just pass the $F_1$ component thereof, this component being detected by means of detector 32 resulting in the envelope waveform 66 of FIG. 2D. In a similar manner, the $F_2$ signal is detected by means of detector 33 resulting in the envelope waveform 68 of FIG. 2E. Since the $F_1$ signal was transmitted and therefore received before the $F_2$ signal, delay 36 functions to delay the detected $F_1$ signal so that it is coincident in time with the processed signal in channel 27. This delayed signal is indicated as envelope waveform 66' of FIG. 2F.

Figure 2G:
Figure 2H:

The two envelope signals are provided to difference amplifier 38 where they are subtracted, resulting in a waveform 70 illustrated in FIG. 2G. As was stated, had the target been of the non-resonant variety, the subtraction of the two envelope signals would yield a resultant signal of substantially zero value. Waveform 72 of FIG. 2H is the result of the rectification process, with this signal being provided to display 42 which would then indicate a definite suspicious target.

Accordingly, a sonar system has been provided which is of relatively simple construction and which is capable of not only detecting the presence of a target but classifying it as to whether or not it is of the resonant variety. Although two alternatively transmitted pulses are illustrated by way of example, it is to be understood that various modifications may be made. For example, not only may the pulses be transmitted simultaneously, but a plurality of pairs of such pulses may be utilized with similar signal processing as illustrated in FIG. 1 to provide for even more precise classification.

What we claim is:

1. A sonar system for the detection and classification of targets within a target area under surveillance comprising:
   (A) means for transmitting, toward said target area, a first discrete pulse of frequency $F_1$ and a second discrete pulse of frequency $F_2$;
   (B) said frequencies $F_1$ and $F_2$ being slightly different from one another and within the resonant frequency range of expected targets;
   (C) receiver means responsive to acoustic returns due to said transmitted pulses for providing a composite output signal;
   (D) means for separating said output signal into respective frequency component signals corresponding to the transmitted frequencies $F_1$ and $F_2$;
   (E) means for detecting respective ones of said frequency component signals to obtain the envelopes thereof;
   (F) means for subtracting respective detected signals; and
   (G) rectifying means coupled to the output of said means for subtracting for providing a unidirectional signal in response thereto.

2. Apparatus according to claim 1 which includes:
   (A) display means operable to display the results of said rectification.

3. Apparatus according to claim 1 wherein:
   (A) said first and second pulses are transmitted alternatively, and which includes
   (B) means for delaying the first detected signal prior to said subtraction.

* * * * *